United States Patent [19]
Sturt

[11] 3,897,408

[45] July 29, 1975

[54] POLYMERISATION PROCESS

[75] Inventor: Alan Charles Sturt, Guildford, England

[73] Assignee: BP Chemicals International Limited, London, England

[22] Filed: Oct. 26, 1973

[21] Appl. No.: 409,794

[30] Foreign Application Priority Data
Nov. 8, 1972  United Kingdom............... 51434/72

[52] U.S. Cl..... 260/92.8 W; 260/884; 260/45.75 T; 260/45.75 V; 260/45.75 W; 260/78.5 CL; 260/78.5 T; 260/82.1; 260/85.5 XA; 260/85.7; 260/86.3; 260/87.5 C

[51] Int. Cl. ............................................ C08f 3/30

[58] Field of Search... 260/92.8 W, 92.8 A, 45.75 R

[56] References Cited
UNITED STATES PATENTS

| | | | |
|---|---|---|---|
| 3,042,665 | 7/1962 | Jankowiak | 260/92.8 |
| 3,383,346 | 5/1968 | Smith | 260/23 |
| 3,663,655 | 5/1972 | Sturt | 260/875 |
| 3,725,375 | 4/1973 | Sturt | 260/92.8 W |

*Primary Examiner*—Joseph L. Schofer
*Assistant Examiner*—John Kight
*Attorney, Agent, or Firm*—Brooks Haidt Haffner & Delahunty

[57] ABSTRACT

A vinyl halide polymer latex is converted into a polymer suspension of larger particle size by adding monomer and suspending agent and destabilising the latex. A process modifier, such as a heat stabiliser is added before the suspension is finally formed and the added monomer polymerised or rested off.

11 Claims, No Drawings

POLYMERISATION PROCESS

The present invention relates to a process for the preparation of vinyl halide polymers.

The polymerisation of vinyl halides in aqueous dispersion is well known. The product may be in the form of a latex or a suspension. Latices are stable for some time in the absence of stirring and the polymer cannot normally be recovered by simple centrifuging. The polymer cannot normally be recovered by simple centrifuging. The polymer particles in a suspension are larger and will settle out if the agitation used to control the system during polymerisation is stopped. The polymer can normally be easily separated from the aqueous phase e.g. by centrifuging.

Latices are generally produced by the well known technique of emulsion polymerisation using a water soluble initiator (i.e. one that partitions largely in the aqueous phase). In such polymerisations the necessary components are stirred or otherwise mixed together under polymerisation conditions. Emulsifiers are used to maintain the dispersion of the monomer and/or polymer in the aqueous phase and the particle size of the dispersion can be controlled by controllng the amount of emulsifier present.

To make a latex with a monomer-soluble initiator it is generally necessary to preform monomer droplets of the desired size prior to the polymerisation, usually by vigorous agitation or more commonly homogenisation of the monomer with water and emulsifier. This technique has characteristics which are different from conventional emulsion polymerisation and for this reason it is often known as a 'micro-suspension' process, but nonetheless the product is generally in the form of a latex which cannot normally be separated by centrifuging.

In our co-pending application Ser. No. 408,223 filed Oct. 18, 1973. (BP Case CPE 3423) there is described a process for the polymerisation of a vinyl halide containing monomer which comprises polymerising the monomer in an aqueous phase containing an emulsifier in the presence of a free radical azo initiator where the polymerisation is carried out at or below the saturated vapour pressure of the monomeric material under the prevailing conditions and in the substantial absence of monomer droplets throughout the polymerisation.

It is often found convenient to incorporate or convert latex particles, while still maintaining them in aqueous dispersion, into larger particles which can readily be isolated from the aqueous phase by conventional suspension polymerisation isolation techniques. To achieve this result the latex polymer particles must be so bound that the resultant suspension sized particles do not subsequently break down into latex sized particles during recovery to a dried product.

This result has been obtained by carrying out the following steps (a) (b) and (c) on a vinyl halide polymer latex in any order with agitation:

a. contacting the latex polymer particles with vinyl halid monomer.

b. inactivating the emulsifying agent of the latex.

c. adding a suspension stabiliser system and subsequently removing the vinyl halide monomer by polymerising or otherwise.

Polymers produced in this way are referred to in this specification as emulsion/suspension polymers. Processes for their production are disclosed e.g. in British Pat. No. 1,309,582, Belgian Pat. Nos. 762,615 and 763,954. The suspension sized particles have sufficient coherence to remain as such throughout the steps involved in the conventional recovery of a suspension polymer to give a dried, powdered product.

The polymer particles of an emulsion/suspension polymer generally have a different particle size distribution from a conventional suspension polymer and while these distributions may convey certain advantages in some cases, it is often difficult to process the polymers on conventional processing equipment because of polymer degradation, even when a known stabiliser or other processing modifier has been blended into the recovered emulsion/suspension polymer.

It is an object of the present invention to provide an improved process for the production of an emulsion/suspension polymer.

Accordingly, the present invention is a process which comprises carrying out the following steps (a), (b), (c) and (d) in any order with agitation on a vinyl halide polymer latex:

a. contacting the latex polymer particles with vinyl halide monomer, b. inactivating the emulsifying agent of the latex, c. adding a suspension stabiliser system and d. adding a non-polymeric modifier, and subsequently removing the monomer.

In step (a) of such a process, the latex polymer particles are mixed with vinyl halide monomer which is either present in the system or added to it. Preferably, the latex polymer particles are added to a vessel containing the vinyl halide monomer.

The vinyl halide monomer is preferably free of copolymerisable compounds but can be a mixture of a vinyl halide with a minor proportion, suitably less than 20% by weight, of a copolymerisable monomer such as acrylonitrile, vinyl acetate, ethylene, propylene, styrene, acrylate and methacrylate esters, maleates, fumarates, and vinyl alkyl ethers. The preferred vinyl halide is vinyl chloride.

The latex polymer particles become incorporated in a vinyl halide monomer/polymer system of suspension sized droplets when the emulsifying agent in the latex is rendered ineffective and step (a) has taken place. When the process as described in British Pat. No. 1,309,582 is employed, the latex polymer particles pass into the vinyl halide monomer to form the monomer/polymer system and when the process as described in Belgian Pat. No. 762,615 is employed, the particles absorb the vinyl halide monomer to form the system. Deactivating the emulsifying agent in the latex in step (b) is brought about preferably by adding an acid or an electrolyte to the system.

A suspension stabiliser system is added as step (c) to maintain the dispersion of suspension sized droplets formed when steps (a), (b) and (c) are completed with agitation. Such systems are well known in connection with conventional suspension polymerisation. They can be of the organic or inorganic type and can be water soluble or insoluble. Examples are polyvinyl alcohol, partially hydrolysed polyvinyl acetates, salts of styrene/maleic anhydride copolymers, gelatins, cellulose ethers and the sparingly soluble metal phosphates such as calcium hydroxy apatite. The presence of a suspension stabiliser system ensures the stability of the vinyl halide monomer/polymer system droplets during the final removal of vinyl halide monomer, e.g. by venting off or by suspension polymerisation and also ensures that the final product is in a form that can be recovered by the techniques of conventional suspension polymerisation.

In order to facilitate the formation of a stable dispersion of the vinyl halide monomer/polymer system it may be necessary to add additional water to the system so that the phase ratio of the monomer/polymer system to water is in the same range as that normally found in suspension polymerisation systems. The need for the addition of water in many cases is due to the fact that emulsion systems are stable when containing a higher proportion of solids than equivalent suspension systems.

The present application is not concerned with the modification of vinyl halide polymers by blending them with other polymers. It is limited to the use of modifiers that are not polymeric materials. Non-polymeric modifiers, for the purposes of the present invention, are processing modifiers, fillers, pigments, blowing agents, light stabilisers, lubricants and processing oils. These are needed to allow processing to be carried out in processing equipment without excessive degradation of the vinyl halide polymer occurring. Examples of such compounds are lead salts, such as lead carbonate, lead stearate maleate, tribasic lead sulphate, dibasic lead stearate, phthalate, silicate, dibasic lead phosphite, tin compounds such as dibutyl tin dilaurate, octyl tin maleate, butyl thiotin esters, octyl thiotin esters, an example of which is di-n-octyl tin bis-iso-octyl mercaptoacetate, salts of organic acids, especially fatty acids, such as calcium, zinc, magnesium, barium, cadmium, sodium and strontium stearates which may be used with epoxidised soya bean oil or triphenyl phosphite in synergistic systems, process oils such as paraffins, waxes such as polyethylene wax, and derivatives of montan wax, and partial esters of polyhydric alcohols, such as glyceryl mono-oleate.

When the final stage of the process involves polymerisation it is important to choose a modifier which does not totally inhibit the final suspension polymerisation in the production of the emulsion/suspension polymer.

The non-polymeric modifiers can be added in the proportions which are used in conventional compounds, but the process of the invention permits the use of smaller proportions because of more efficient use. When the modifier is a lead salt or a tin ester stabiliser, e.g. tribasic lead sulphate or dibasic lead stearate, the preferred quantity of stabiliser lies in the range 0.1 to 3% by weight on final product.

The non-polymeric modifier may be added at any stage of the process prior to the removal of the vinyl halide monomer. For example, it may be added to the latex before steps (a) (b) and (c) take place. A preferred procedure is to add the modifier to the vinyl halide monomer to be used in step (a). This is particularly preferred when the latex is then added to this monomer.

Any vinyl halide polymer latex capable of being converted into an emulsion/suspension polymer, e.g. according to the techniques described in the above mentioned patent specifications, can be employed in the process of the present invention. The vinyl halide polymer of the latex may be a copolymer of a vinyl halide with a suitable copolymerisable compound as disclosed in said specifications. Vinyl chloride is the preferred vinyl halide.

A preferred embodiment of the present invention is that in which the polymer latex is prepared using as emulsifying agent the salt of a carboxylic acid, which acid is not itself an effective emulsifying agent. Suitably, this type of emulsifying agent is rendered ineffective by the addition of an approximately stoichiometrical amount of an acid, such as acetic acid or phosphoric acid, which is stronger than the emulsifying agent acid, to the system when it is desired to incorporate the latex polymer particles into suspension sized vinyl halide monomer/polymer droplets during the emulsion/suspension process. Examples of suitable carboxylic acid salt emulsifying agents are the carboxylic acid soaps, e.g. the alkali metal or ammonium salts of lauric acid, stearic acid, palmitic acid and myristic acid.

In preferred embodiments of the present invention the ratio of latex polymer to vinyl halide monomer is in the range 1:99 to 90:10, preferably 5:95 to 75:25 and most preferably 15:85 to 60:40.

The vinyl halide monomer is preferably removed from the monomer/polymer by polymerising under conventional suspension polymerisation conditions, using a monomer suitable polymerisation initiator. Alternatively, it can be vented off from the reaction vessel after a stable system has been established. Any vinyl halide monomer remaining with the isolated product readily evaporates during the recovery process.

It is found that when non-polymeric modifiers are added to vinyl chloride polymers according to the process of the present invention, the resultant product exhibits the improvement or change of property for which the modifier was added to a surprisingly high degree.

The present invention is illustrated by the following examples:

COMPARATIVE EXAMPLE 1

Manufacture of an Emulsion/Suspension Polyvinyl Chloride

| | |
|---|---|
| Vinyl Chloride | 3264 ml |
| Soft Water | 10,050 g |
| PVC latex (solids content 47.7%) prepared using azo bisisobutyronitrile initiator according to British patent application 48623/72 - emulsifying agent, ammonium laurate. | 5100 g |
| Lauroyl peroxide | 4.5 g |
| Methocel 65HG 50 (hydroxypropylmethyl cellulose) | 5.4 g |
| Phosphoric acid | 37.5 g in 375 g water |

The Methocel was dissolved in water and added to the reactor along with the remaining water, lauroyl peroxide, and the PVC latex. The reactor contents were purged with nitrogen and evacuated twice. The reactor contents were stirred at 700 rpm and the vinyl chloride added. The phosphoric acid was pumped in over about 15 minutes. The contents were heated to 60°C and the reaction continued until the pressure had dropped to 60 psi when the contents were cooled and vented and the product removed. The reaction time at 60°C was 2 hours 10 mins. The filtered, dried, emulsion/suspension product was a powder with a bulk density of 0.69 g/ml.

This product and a conventional vinyl chloride suspension polymer were compounded with 2% tribasic lead sulphate and 1% calcium stearate and extruded from a laboratory extruder. The extrudate of the emulsion/suspension polymer was glossy with pink streaks while the extrudate of the conventional suspension resin was entirely pink.

EXAMPLE 1

| | |
|---|---|
| Vinyl chloride | 2790 ml. |
| Soft water | 8590 g |
| PVC Latex (as in comparative Example 1) | 4590 g |
| Lauroyl peroxide | 4 g |
| Methocel 65HG 50 (hydropropylmethyl cellulose) | 4.6 g |
| Tribasic lead sulphate | 93 g |
| Phosphoric acid | 32 g in 320 ml water |

The Methocel was dissolved in water and added to the reactor along with the remaining water, lauroyl peroxide, the PVC latex and the lead sulphate. THe reactor contents were purged with nitrogen and evacuated twice. The vinyl chloride was added, stirring at 700 rpm. The phosphoric acid was pumped in over about 15 minutes. The contents were heated to 60°C and the reaction continued until the pressure had dropped to 60 psi when the contents were cooled and vented and the product removed. The reaction time was 2 hours 5 mins. at 60°C. The filtered, dried product was a powder of bulk density 0.74 g/ml.

When compounded with 1% calcium stearate and extruded under the same conditions as in comparative Example 1, the product extruded 50% faster than the commercial PVC suspension resin compounded to give the same composition. The extrudate was white and of high quality while the comparative commercial material gave a pink product.

EXAMPLE 2

The recipe and procedure were as for Example 1 except that dibasic lead stearate was used in place of tribasic lead sulphate.

The reaction time at 60°C was 2 hours 10 minutes. The centrifuged dried product had a bulk density of 0.67 g. ml$^{-1}$.

When compounded with 1% calcium stearate, the products gave the same high quality extrudate as described in Example 1.

EXAMPLE 3

| | |
|---|---|
| Vinyl chloride | 2695 ml |
| Soft water | 3864 ml |
| Azo bisisobutyronitrile initiated PVC latex (23.1% solids) prepared according to British patent application No. 48623/72. Emulsifying Agent: ammonium laurate | 8870 ml |
| Lauroyl peroxide | 3.9 g |
| Methocel 65HG 50 (hydroxypropyl methylcellulose) | 4.4 g |
| Dibasic lead stearate | 89.8 g |
| Calcium stearate | 44.9 g |
| Phosphoric acid | 61.8 g in 618 ml water |

The procedure was the same as for Example 1 except that dibasic lead stearate was used in place of tribasic lead sulphate and calcium stearate was also added at the start.

The reaction time at 60°C was 3 hours.

The centrifuged dried product was a powder with a bulk density of 0.67 g ml$^{-1}$.

EXAMPLE 4

| | |
|---|---|
| Vinyl chloride | 2500 ml |
| Soft water | 7385 ml |
| Latex from comparative Example 1 | 4100 g |
| Lauroyl peroxide | 3.5 g |
| Methocel 65HG 50 (hydroxypropyl methylcellulose) | 4.1 g |
| Mellite 12 (dibutyl tin dilaurate) | 83 g |
| Phosphoric acid | 57 g in 570 ml water |

The procedure was as for Example 1 except that Mellite 12 was used in place of tribasic lead sulphate.

The reaction time at 60°C was 3 hours.

The centrifuged, dried product had a bulk density of 0.78 g ml$^{-1}$. When compounded with 1% calcium stearate the product extruded ca 50% faster than the commercial suspension polymerised resin of equivalent formulation.

The extruded product was yellow in colour, while the commercial extrudate was reddish-black in colour.

EXAMPLE 5

| | |
|---|---|
| Vinyl chloride | 2500 ml |
| Soft water | 7670 ml |
| Azo bisisobutyronitrile PVC latex (45.4% solids) prepared according to British patent application No. 48623/72. Emulsifying agent:ammonium laurate | 4100 g |
| Lauroyl peroxide | 3.5 g |
| Methocel 65HG 50 (hydroxypropyl methylcellulose) | 4.1 g |
| Mellite 31 (a thiotin stabiliser) | 83 g |
| Phosphoric acid | 28.5 g in 285 ml water |

The procedure was as Example 1 except Mellite 31 was used in place of tribasic lead sulphate and the reaction contents were cooled when pressure had dropped to 82 psi.

The reaction time was 10½ hours. The centrifuged dried product had a bulk density of 0.82 g ml$^{-1}$.

EXAMPLE 6

A resin was made with the following recipe:

| | |
|---|---|
| Vinyl chloride | 3,150 g |
| Distilled water | 9,000 g |
| PVC latex (35% solids) made conventionally by using a water soluble initiator and ammonium stearate as emulsifying agent | 3,850 g |
| Hydroxypropyl methyl cellulose (Methocel 65HG 50) | 9 g |
| Dibasic lead stearate | 90 g |
| Titanium dioxide (Rutiox) | 90 g |
| Phosphoric Acid (20%) | 30 ml |
| Lauroyl Peroxide | 9 g |

The dibasic lead stearate, Rutiox, and lauroyl peroxide were poured into a four gallon stainless steel reactor which was closed and evacuated. The vinyl chloride was then sucked in and the mixture stirred at 450 rpm for 30 minutes. (The reactor was fitted with a disc turbine and was baffled).

A solution of the Methocel in 4 L. of distilled water was then pumped into the reactor and this was followed by the latex, the remainder of the water and the phosphoric acid. The whole charge was stirred at 450 rpm and heated at 60°C for 5 hours.

After this period the reactor was cooled, the unconverted vinyl chloride vented to atmosphere and the product removed. This was separated on a basket centrifuge and the wet resin dried in a vacuum oven at 50°C for 24 hours. The resin was a coarse white powder. The filtrate from the centrifuge was clear, showing that the additives remained in the resin.

A sample of the resin after heating for 30 minutes at 180°C in an oven turned a pale straw colour. Extrusion of the resin from a small Brabender extruder with a temperature profile of 156/171/189°C and 194°C on the die gave a smooth, white glossy rod with an output rate of 11.7 g./min at a torque of 20 Nm.

By way of comparison an emulsion/suspension polymer was prepared without the lead and titanium salts present in the polymerisation, and then brought to the same formulation by normal compounding. On heating in the oven for 30 minutes at 180°C the resin turned purple, different particles attaining different degrees of discolouration. On extrusion under the same conditions as above the resin gave an extrudate which was partially degraded, very irregular, streaky and lumpy and also brittle. It also extruded more slowly, with an output rate of 9.0 g./min at a torque of 10 Nm.

The above Examples show that products are produced by the process of the present invention which can be readily extruded without significant degradation and which under certain conditions have very high bulk densities. Similar emulsion/suspension products when compounded with an equivalent amount of stabiliser could not be extruded without degradation taking place. Significantly higher rates of extrusion could be obtained from the products of the present invention than could be achieved using standard suspension resins.

I claim:

1. A process which comprises carrying out the following steps (a), (b), (c) and (d) in any order with agitation on a vinyl halide polymer latex:
   a. contacting the latex polymer with vinyl halide monomer,
   b. inactivating the emulsifying agent of the latex,
   c. adding a suspension stabiliser system, and
   d. adding a non-polymeric modifier, and then subsequently removing the monomer.

2. A process according to claim 1 wherein the vinyl halide latex is added to the vinyl halide monomer to be used in step (a).

3. A process according to claim 1 wherein additional water is added.

4. A process according to claim 1, wherein the non-polymeric modifier is a thermal stabiliser, lubricant or processing oil.

5. A process according to claim 4, wherein the non-polymeric modifier is a lead salt, a tin compound or a fatty acid salt.

6. A process according to claim 5, wherein the non-polymeric modifier is tribasic lead sulphate or dibasic lead stearate.

7. A process according to claim 1, wherein the non-polymeric modifier is added to the vinyl halide to be used in step (a).

8. A process according to claim 1, wherein the latex is prepared using as emulsifying agent the salt of a carboxylic acid, which acid is not itself an effective emulsifying agent.

9. A process according to claim 8 wherein the carboxylic acid salt emulsifying agent is rendered inactive in step (b) by the addition of an acid which is stronger than the emulsifying agent acid.

10. A process according to claim 1, wherein the ratio of latex polymer to vinyl halide monomer lies in the range 15:85 to 60:40.

11. A process according to claim 1, wherein the vinyl halide monomer is removed subsequent to steps (a), (b), (c) and (d) by polymerising under suspension polymerisation conditions.

* * * * *

UNITED STATES PATENT OFFICE
CERTIFICATE OF CORRECTION

PATENT NO. : 3,897,408
DATED : July 29, 1975
INVENTOR(S) : ALAN CHARLES STURT

It is certified that error appears in the above-identified patent and that said Letters Patent are hereby corrected as shown below:

Col. 4, line 25, "suitable" should read --soluble--.

Signed and Sealed this thirteenth Day of April 1976

[SEAL]

Attest:

RUTH C. MASON
Attesting Officer

C. MARSHALL DANN
Commissioner of Patents and Trademarks